United States Patent [19]

Müller

[11] 3,918,505

[45] Nov. 11, 1975

[54] WEAR LINK FOR TIRE CHAINS

[75] Inventor: Anton Müller, Unterkochen, Germany

[73] Assignee: Eisen- und Drahtwerk Erlau Aktiengesellschaft, Aalen, Germany

[22] Filed: Feb. 19, 1974

[21] Appl. No.: 443,854

[30] Foreign Application Priority Data

Feb. 19, 1973  Germany............................ 2308172
Mar. 1, 1973  Germany............................ 2310173

[52] U.S. Cl................................. 152/243; 152/245
[51] Int. Cl.²......................................... B60C 27/00
[58] Field of Search ........... 152/231, 232, 233, 239, 152/240, 243, 244, 245; 59/84

[56] References Cited
UNITED STATES PATENTS 1,513,679  10/1924  Thimmes ............................ 152/245
1,889,300  11/1932  Thimmes ............................ 152/245
2,212,911  8/1940  Bambenek ........................... 152/245
3,595,292  7/1971  Muller ................................ 152/243
3,595,293  7/1971  Muller ................................ 152/243

*Primary Examiner*—Robert B. Reeves
*Assistant Examiner*—Larry H. Martin
*Attorney, Agent, or Firm*—Walter Becker

[57] ABSTRACT

A wear link for a tire chain in which the wear link has a pair of openings for engaging one or more chain links of the chain. The wear link is perpendicular to the plane of the tire chain when the tire chain is stretched out flat and has a longitudinal edge facing the tire and a longitudinal edge facing away from the tire. At least one receiving channel is provided leading from an edge of the wear link body inwardly to a respective opening. The wear link body is in the form of a web and is rectangular.

17 Claims, 17 Drawing Figures

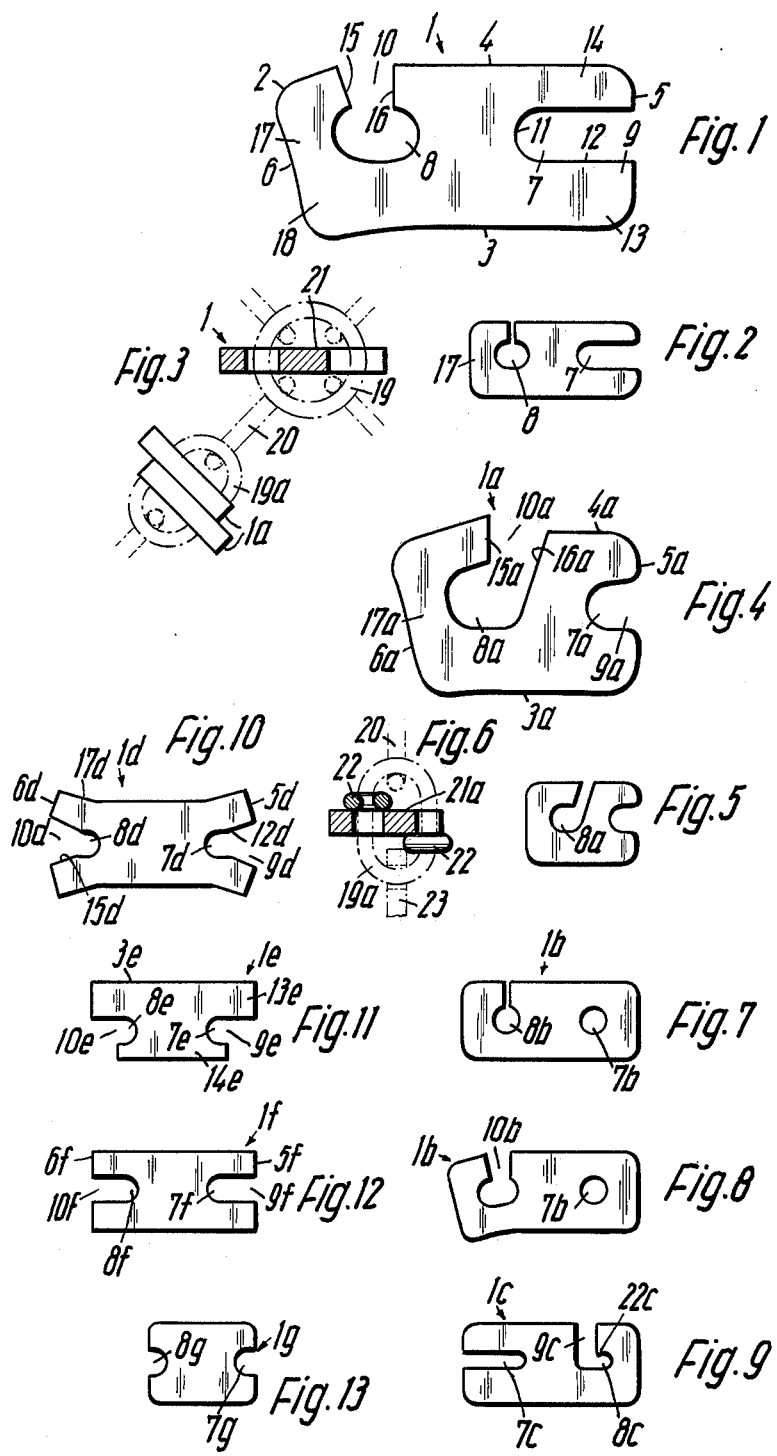

WEAR LINK FOR TIRE CHAINS

The present invention relates to wear elements for tire chains with at least one web-like link body which between a tire engaging surface and a tread surface facing away therefrom comprises at least two separate adjacent receiving openings for at least one chain link of the tire chain, while at least one of said receiving openings extends to the pertaining rim side of the link body for forming an insert opening.

It is an object of the present invention to provide a wear element of this type in such a way that it will be of a simple construction, can easily be mounted and will have a safe hold.

These and other objects and advantages of the invention will appear more clearly from the following specification in connection with the accompanying drawings, in which:

FIG. 1 illustrates a side view of a wear element or wear link and more specifically shows the same in its condition of assembly.

FIG. 2 shows on a smaller scale than that of FIG. 1 the wear link in its condition of operation.

FIG. 3 is a section through the wear link of FIG. 2 with a portion of the tire skid protective chain.

FIGS. 4–6 illustrate another embodiment of the invention in illustrations corresponding to those of FIGS. 1–3.

FIGS. 7 and 8 illustrate a further embodiment of a wear link according to the invention in closed and opened condition respectively.

FIGS. 9–13 respectively illustrate in side view additional embodiments of the wear link according to the invention.

Figure 14:
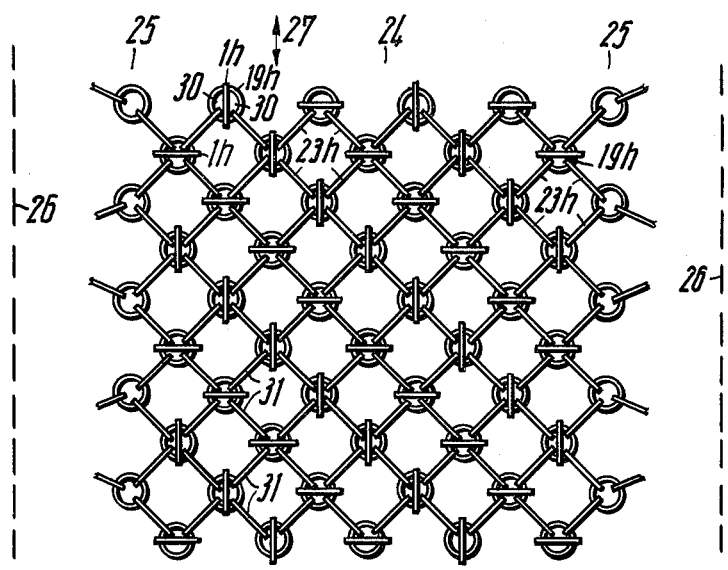

FIG. 14 is a view of a tire chain according to the invention.

Figure 15:
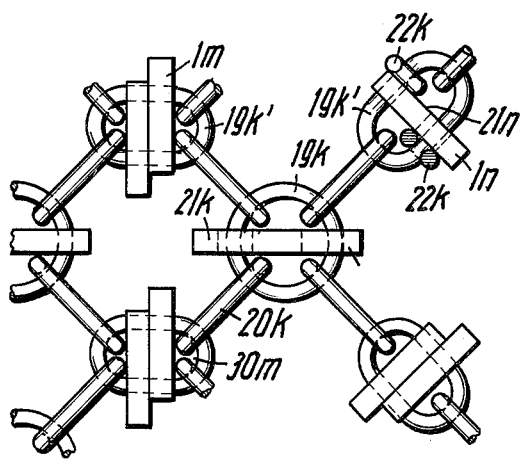

FIG. 15 illustrates a cut-out of a further embodiment of a tire chain according to the invention but on a larger scale of that of FIGS. 1–14.

Figure 16:
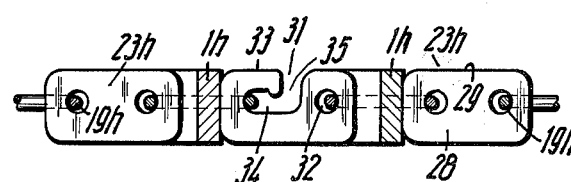

FIG. 16 represents in section a cut-out of the part where the tread portion merges with a side part of the tire chain according to FIG. 14.

Figure 17:
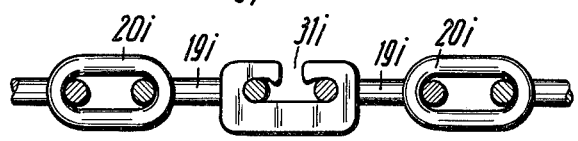

FIG. 17 shows still another embodiment of the invention in an illustration similar to that of FIG. 16.

The above outlined objects have been realized with a wear link of the above mentioned general type by so designing the wear link that both receiving openings are provided with insert openings located at different rim sides of the link body while the distance between the receiving openings corresponds to the distance of link sections of the chain link which are located opposite to each other. Both receiving openings may be designed for receiving sections of one and the same chain link in such a way that the wear link can be aligned precisely.

The wear link according to the invention is provided particularly for the purpose of being connected to a single chain link of a link chain or to a link within the web-link-system, said chain link in its turn being held in the chain structure by means of separate chain links. The chain link may be circular, flat oval or of a similar design while this chain link in condition of operation is substantially parallel to the tire surface. In other words, it is a so-called horizontal link.

It is also possible to secure the wear link according to the invention relative to the chain link by correspondingly forming the pertaining chain link with a correspondingly narrow tolerance and by a welding seam or the like.

A particularly advantageous safety element is obtained when the latter is formed by at least one separate safety element which is connected preferably directly to the chain link of the tire chain and which for instance may be arranged adjacent to the receiving opening and engage the side surface of the link body so that the wear element is secured against displacement at a right angle to its plane. This is the case in particular when within the region of the two receiving openings, and/or at an angle on oppositely located side surfaces of the link body there are provided safety elements. The safety element itself may be designed as wear link for instance as wear element on two identical wear links according to the invention may be provided adjacent to each other on one and the same chain link in such a way that they act mutually upon each other as safety elements.

Inasmuch as with the arrangement according to the present invention the wear member may at any time also be arranged on a finished tire chain, it is possible, starting with a base chain to equip the same depending on the requirements with wear links in corresponding zones and in corresponding positions so that it will best meet the requirements. All wear links may with their central planes arranged in one direction be located or wear links may be arranged in two or more groups. In this connection, the wear links of each group are arranged in a different position than the wear links of each group are uniformly distributed over the length of the tire chain or over the tire circumference. Expediently, the web members are arranged in a position which is different from the position of the wear links so that they can take over such functions as for instance the gripping which are not sufficiently carried out by the selected position of the wear links.

If a bottom contact of the side parts of the tire chain is not to be expected, it will suffice to provide the wear links only at the tread portion. It is, however, also possible to protect the lateral surfaces of the tire additionally by providing wear links on at least one side part of the tire chain.

Referring now to the drawings in detail, FIGS. 1 and 2 illustrate a wear link according to the invention which comprises a link body 1 which in condition of operation as illustrated in FIG. 2 has an outer longitudinally rectangular shape with rounded corners 2. One longitudinal side or longitudinal edge 3 of the link body 1 represents the running surface for the road contact whereas the longitudinal edge 4 which faces away therefrom and is parallel thereto forms the tire engaging surface, the two longitudinal edges 3, 4 being connected to each other by narrow edges 5, 6 located at a right angle to said longitudinal edges 3, 4.

In the link body 1, for purposes of increasing the lifetime or the wear volume two separate receiving openings 7, 8 for a chain link or a chain ring of a tire chain are provided which openings are closer to the tire engaging surface 4 than to the running surface 3 while both openings 7, 8 have substantially the same distance from the running surface 3. Each of the receiving openings 7 and 8 has an insert opening 9, 10 respectively. Both openings 7, 8 are as to their shape and way of action approximately flat oval or longitudinal while extending in the longitudinal direction of the link body in other words in the longitudinal direction of the running surface 3. The receiving opening 7 is formed by a continuous slot extending in the longitudinal direction of the link body 1. This slot starts from the narrow side 5 of the link body and at said narrow side forms the inlet opening 9, whereas the inner half of the link of the slot forms the receiving opening 7 which at the bottom of the slot is confined by a semicircular bottom edge 11. The side surfaces 12 of the slot and thus of the inlet opening 9 as well as of the outlet opening 7 are located parallel to each other and to the running surface 2. The said slot divides the link body within the region of the pertaining narrow side 5 into two free projecting legs 13, 14 which are parallel to the running surface 3, and the end surfaces of which form the pertaining narrow side 5 of the link body 1. The length of the slots 7, 9 corresponds approximately to one-third of the length of the link body 1. The receiving opening 9 may be closed or opened to a limited extent but in closed condition is always smaller than the diameter of the part to be protected.

The other receiving opening 8 is for purposes of facilitating the insertion of chain links located at a greater distance from the pertaining narrow edge 6 of the link body than is the receiving opening 7 from the narrow edge 5 while the inlet opening 10 of the receiving opening 8 is provided on the tire engaging side 4 and in condition of operation is located symmetrically with regard to the pertaining central plane of the opening 8. The receiving opening 8 is in opened condition according to FIG. 1 as well as in condition of operation according to FIG. 2 wider than the inlet opening 10 while its central plane which is parallel to the running surface 3 is located in the central plane of the receiving opening 7. The confining edges 15, 16 of the inlet opening 7 converge in opened condition in a funnel-shaped manner toward the pertaining receiving opening 8, whereas in condition of operation according to FIG. 2 the confining edges 15, 16 are parallel and directly adjacent to each other so that no parts can enter. One confining edge 15 of the inlet opening 10 is provided on a hook or angle shaped bendable leg 17 which for purposes of easier accessibility is formed by that end of the link body 1 which forms the adjacent narrow edge 6. The bend-deforming section 18 of the leg 17 is located substantially between the receiving opening 8 and that corner of the link body 1 which is formed by the pertaining narrow side 6 and running surface 3 so that an opening by the running pressure will be avoided.

The wear link according to FIGS. 1–3 is provided in particular for arrangement on a circular chain link 19 of a tire chain which indicated by dot-dash lines in FIG. 3. This chain link 19 may be formed for instance by a chain link located at a nodule point and engaged by one or more chain links (in the specific illustration of FIGS. 3, 4). Said last mentioned chain links may for instance be flat oval chain links 20. The wear link is for purposes of assembly inserted with its slots 7, 9 at an incline into the chain link 17 and is then pivoted toward the same in such a way that the oppositely located link section of the chain link 19 passes through the inlet opening 10 into the receiving opening 8 whereupon the inlet opening 10 is closed by pressing back the leg 17.

On both sides of the wear link which is located symmetrically with regard to an axial plane of the chain link 19 and which for improving the self-cleaning as well as its adaptation of its location to the road engages the chain link 19 with a certain play of movement, there will then be located the further chain links 20 engaging the chain link 19. In view of the fact that the ends of the wear link protrude to a different extent beyond the chain link 19, a favorable rolling off behavior will be realized.

FIGS. 4–6 have corresponding parts designated with the same reference numerals as in FIGS. 1–3 but with the additional letter a.

With the embodiment according to FIGS. 4–6, the link body 1a is shorter than with the embodiment according to FIGS. 1–3. The slot which forms the receiving opening 7 and the receiving opening 9 is so short that in mounted condition it is nearly completely filled in by the engaging chain link 19a. The confining edge 16 which is located opposite the leg 17a and pertains to the inlet opening 10a is located at a slant to the longitudinal edges 3a, 4a of the link body 1a in such a way that that end of the confining edge 16a which is located adjacent the pertaining longitudinal edge 4a is located closer to the narrow edge 5a. The confining edge 16a extends rectilinearly to the confining edge of the receiving opening 8a which confining edge is transverse to the edge 16a and thus forma a lateral surface of the receiving opening 8a whereby the described pivoting movement will be facilitated. In this way, the receiving opening 8a while being widened relative to the inlet opening 10a nevertheless forms an undercut exclusively within the region of the leg 17a. The distance of the receiving opening 8a from the pertaining narrow edge 6a is more than twice as great as the corresponding distance of the receiving opening 7a from the narrow edge 5a. The receiving openings 7a, 8a are located in the middle between the longitudinal edges 3a, 4a so that also for instance the longitudinal edge 4a which includes the inlet opening 10a can be used as running or traveling surface.

The wear link illustrated in FIGS. 4–6 is provided in particular for arrangement on a flat oval chain link 19a of the tire chain which similar to the chain link 19 (FIG. 3) is designed for instance as a welded round steel link. The wear link is connected to the two parallel straight link sections of the chain link 19a in such a way that a link section engages the receiving opening 7a, and the oppositely located link section engages the receiving opening 8a. If the thickness of the wear link which similar to the wear link of FIGS. 1–3 is plate shaped and has parallel side surfaces 21a is less than the length of the rectilineal link section of the chain ring 19, expediently safety members 22 are provided for securing the position of the wear link. In the illustrated embodiment, the safety members are formed by wear rollers 22 which extend around the corresponding link sections of the chain link 19a and are for instance bent out of round steel. One wear roller 22 each is provided within the region of each receiving opening 7a, 8a and the two wear rollers 22 are located on those side surfaces 21a of the wear link which face away from each other.

It is also possible according to FIGS. 4–6 to provide two identical or image symmetrical wear links and to arrange the same on one and the same chain link 19a directly adjacent to each other in such a way in the manner shown in FIG. 3 that they protrude to a different extent on both sides beyond the chain link 19a and have those side surfaces 21a thereof which face each other engage each other for securing the position of said links. The total thickness of the two wear links corresponds to the rectilinear link sections of the flat oval chain link 19a so that a substantial stabilization as to the location of this chain link will be obtained. The chain link 19a may be engaged only by round steel chain links for instance chain links of identical shape or only by web links or for instance in conformity with FIG. 6 by at least one round steel link 20 and at least one web link 23. These engaging chain links likewise contribute to securing the location of the wear link as will be evident from FIG. 3 with regard to the circular ring member 19. The links 20 according to FIGS. 3 and 6 may also be replaced by web links so that in toto a web-ring system is obtained.

According to the embodiments illustrated in FIGS. 7–17 corresponding parts have been designated with the same reference numerals as in FIGS. 1–6 but in FIGS. 7 and 8 the numerals have additionally been provided with the index b and in FIG. 9 have been additionally provided with the index c, etc.

The embodiment illustrated in FIGS. 7 and 8 differs from that according to FIGS. 1–3 primarily in that the receiving opening 7b in the link body 1b is formed by a circumferentially completely closed circular hole which therefore has no insert opening. The other receiving opening 8b is in its condition of operation formed by a hole of identical diameter. According to the present invention it is thus also possible to design the wear link with at least one closed receiving opening in such a way that it can be used as transverse web of a chain link 19, 19a respectively.

According to the embodiment illustrated in FIG. 9, the insert opening 9c of the receiving opening 8c, is relative to the latter offset in the direction toward the other receiving opening 7c and in the longitudinal direction of the link body 1c in such a way that an annular slot is formed. In the transition region between the insert opening 9c and the receiving opening 8c, the projecting angle of the link body 1c forms a locking nose 22c which forms one piece with the link body 1c so that the link section of the chain link of the tire chain is locked in the receiving opening 8c.

As will be seen from FIG. 10, the two insert openings 9d, 10d may also be provided in the two narrow sides 5d, 6d of the link body 1d. The confining edges 12d, 15d for said insert openings are respectively formed by the lateral surfaces of two bendable legs 17d which in opened condition diverge in a V-shaped manner and during the assembly are bent toward each other. The wear link according to FIG. 10 is symmetrical with regard to two central planes which are located at the right angle to each other and at the right angle to the plane of the wear link, one of said planes being parallel to the longitudinal direction of said wear link. In this way, the wear link may according to FIG. 10 be connected to a chain link of the tire chain in any desired manner with the same effect. However, the wear link may also be designed nonsymmetrical with regard to at least one of said planes, in particular with regard to the last mentioned plane.

The assembly of the wear link according to FIGS. 7 and 8 on a chain link of a tire chain is expediently effected by inserting this chain link first into the still open, i.e., non-welded closed opening 7b. This opening is then closed for instance by welding whereupon the chain link by a pivoting movement is introduced also into the receiving opening 8b. Thereupon the wear link can be closed. The mounting of the wear link may be effected for instance in conformity with FIG. 10 by inserting the wear link into a chain link which as to its inner clear opening approximately corresponds to its length. Thereupon this chain link is compressed in such a way that two link sections located opposite to each other pass into the receiving openings 7d, 8d and that the wear link can be closed by bending the leg 17d. However, it is also possible to mount the wear link according to FIG. 10 in a manner which corresponds to the mounting or assembly of the wear link according to FIGS. 7 and 8. In other words the wear link may according to FIG. 10 be inserted into a not yet welded closed, i.e., into an open chain link which is closed only thereafter for instance by welding.

The wear member according to FIG. 11 has similar to the wear member of FIG. 9 no bendable arm. The web 13e which forms the tire engaging surface 3e and uninterruptedly extends over the entire length of the link 41e has a greater cross sectional height than the other link web 4e of the link body 1e. Moreover, the web 13e is longer than the web 4e and is symmetrically designed with regard to its central plane which is at a right angle with regard to its longitudinal direction and its plane. The central openings 7e and 8e are with the pertaining insert openings 9e, 10 dimensioned so small that the wear link for purposes of assembly can in an inclined position be introduced into a chain link of the tire chain and can then by turning about an axis which is parallel to its plane and at a right angle to its longitudinal edges 3e, 4e, be moved in position according to FIG. 3 or FIG. 6. Thereupon the wear link can by safety elements for instance by wear rollers 22 according to FIG. 6 be secured in its position. The securing of the wear link may also be arrested by depressing the wear link or the ring in such a way that the wear web is arrested for instance by changing the insert opening. Furthermore, also the chain links engaging the chain link 19, 19a can contribute to securing the position of the wear link as will be evident for instance from FIGS. 3 and 15 with regard to the links 20 and 20k.

According to the embodiment of FIG. 12, two insert openings as shown in connection with the embodiment of FIG. 11 are likewise provided again on the narrow sides 5f, 6f of the link body while, however, the slots forming the receiving openings and the insert openings are longer for receiving the chain link of the tire chain so that the link body 1f in mounted condition laterally protrudes relatively far beyond the chain link of the tire chain. The wear link according to FIG. 12 is to be mounted in a manner similar to the wear link according to FIG. 10, while, however, the wear link according to FIG. 12 has no bendable leg but its receiving and inserting openings are designed similar to the receiving openings 7 and insert openings 9 according to FIGS. 1–3.

The wear link according to FIG. 13 differs from that of FIG. 12 primarily in that its receiving and insert openings are similar to those of FIGS. 4–6 designed relatively smaller namely by approximately circular shaped recesses at the narrow edges so that in mounted condition it will not project beyond the pertaining chain link of the tire chain.

As illustrated in FIG. 14, a tire chain according to the present invention comprises a traveling part 24 which extends in the longitudinal direction of the tire chain as indicated by arrow 27 and which is arranged between two equal side parts 25 which are only partially illustrated and which likewise extend in the longitudinal direction indicated by the arrow 27. Each side part 25 comprises a side chain 26 located at the pertaining rim side of the tire chain. In mounted condition, the traveling part 24 rests on the circumferential surface of the tire, whereas the side parts 25 are provided on the lateral surfaces of the tire.

With the illustrated embodiment, the net shaped traveling part 24 comprises circular round steel ring links 19h which extend parallel to the plane of the stretched-out tire chain. The arrangement is such that four web links 23h engage one ring link 19h and engage a further ring link 19h. The running part 24 furthermore comprises wear links 1h engaging a single ring link 19h. The web links 23h which form with the longitudinal edge a traveling surface 28 and with the longitudinal edge facing away therefrom form an engaging surface 29 are for increasing the gripping ability located in an opposite manner at a 45° angle with regard to the longitudinal direction indicated by the arrow 27 of the tire chain and in planes which are at a right angle to the plane of the tire chain. The longitudinal central planes of the two links 1h are with regard to the longitudinal direction indicated by arrow 27 of the tire chain located in directions which deviate from the web links 23h, namely for purposes of increasing the track holding, extend parallel to the longitudinal direction indicated by the arrow 27 and for purposes of establishing a better grip effect, at a right angle thereto while a wear link 1h is inserted into each ring link 19h. In the longitudinal direction indicated by the arrow 27 of the tire chain, always one wear link parallel to this longitudinal direction alternates with a wear link which is located at the right angle to this longitudinal direction as is also the case at a right angle to the longitudinal direction indicated by arrow 27 over the width of the traveling part 24.

The lateral parts 25 are with the illustrated embodiment provided with similar configurations as the part 24 while also on links 19h of each lateral part 25, wear links 1h are mounted preferably identical wear links 1h as in the traveling part 24. These ring links 19h are likewise engaged by four web links 23h so that also the lateral parts 25 are substantially formed by ring links 19h, web links 23h, and wear links 1h. The web links may be designed like the wear links as far as their dimensions and cross section is concerned.

As shown in FIG. 14, each wear link 1h divides the ring opening of the pertaining ring link 19h into two individual openings 30. Each individual opening 30 is engaged by two web links 23h arranged at an angle with regard to each other so that a protective tire armament is obtained. The links 23h on both sides of the wear link will thus be prevented from slipping one above the other.

The lateral chains 26 may consist of chain strands of ring links or flat oval links engaging each other or they may be formed by web links interconnecting the ring links or flat oval links.

As will be evident from FIGS. 14, and 16, the web links connected to the traveling part and pertaining to each side part 25 are formed by hook links 31 which are non-detachably connected either to a ring link of the traveling part 24 or to the ring link of the lateral part 25 while they have a recess in the form of a hole 32 adapted to be engaged by the ring link. For the respective other ring link, these hook links 31 have a hook 33 with a receiving opening 34 shown in FIG. 16 and an insert opening 35 located on the tire engaging side of the tire chain so that the ring link engaging the hook 33 can be disengaged whereby the traveling part 24 can be disengaged from the respective pertaining side part 25. The double hook ring 31i according to FIG. 17 makes it possible to interengage two interengaging links. With the embodiment of FIGS. 16 or 17, one and the same traveling part may, depending on the requirements, exchangeably be connected with different side parts, and it is possible at any desired time to exchange a possibly damaged chain part for a new chain part.

The traveling part and/or the respective side part of the tire chain may also in conformity with FIG. 17 comprise interengaging normal chain links 19i, and 20i. In other words circular shaped or flat oval chain links consisting for instance of round steel while non-illustrated wear links are arranged on chain links 19i which with the chain in such position are parallel to its plane and/or are arranged on chain links 20i which are located on chain links 20i which are at the right angle to said plane as illustrated for instance in FIGS. 1–13 so that the traveling surface of the tire chain is practically formed only by such wear links and not by web links.

With the embodiment illustrated in FIG. 15, wear links 1n, 1m are in addition being arranged on circular shaped chain links 19k and also arranged on flat oval chain links 19k'. The link openings of the flat oval chain links 19k' are likewise subdivided into two individual openings 30m while two connecting links 20k arranged at an angle to each other engage each individual opening 30m. The connecting links 20k may with the illustrated embodiment be formed by flat oval round steel chain links. As illustrated in FIG. 15, the wear links 1n may also be arranged at an angle with regard to the longitudinal direction indicated by the arrow 27, for instance at an angle of 45°.

Securing link means 22, 22k are provided adjacent to the openings of the link body and are carried by the chain links of the tire chain which engage such openings.

Furthermore the link opening of the chain link 19k is divided into two individual opening which are respectively engaged by at least one additional chain link 20k as shown in FIG. 15 for example.

The respective chain link 19a which is provided with the wear link 1a is engaged by at least one web link 23 as shown in FIGS. 3 and 6 of the drawings involves especially only web lengths which comprise a tire engaging surface and a travelling surface. The chain links 19, 19a are interconnected by a connecting link 20, and four connecting links 20 engage at least one of the chain links 19 as apparent in FIG. 3 of the drawings. The travelling part 24 and at least one side part 25 are disengageably interconnected by suspension links, such as simple hooks 31, double hooks 31i, and the like which are located in the longitudinal direction (arrow 27) of the tire chain; the suspension links are preferably of a web-shape while the central planes thereof are located approximately at a right angle to the plane of the tire chain when the latter is in stretched-out position.

It is, of course, to be understood that the present invention is, by no means, limited to the specific showing in the drawings but also comprises any modifications within the scope of the appended claims.

What is claimed is:

1. A wear link for a tire chain comprising interconnected chain links, said wear link comprising a web-shaped link body adapted to be disposed in a plane perpendicular to the tire chain when stretched out flat and having one edge surface for engaging the tire and a wear edge surface parallel to and facing away from one edge surface for engaging a roadway and openings extending through said link body perpendicular to the plane of the link body for engaging at least one chain link of the tire chain, and link receiving channel means extending from the margin of said link body into at least one of said openings, said openings being spaced apart substantially the same distance as chain links of the tire chain which are in opposed relation to each other, said link body when viewed in a direction perpendicular to said plane being substantially rectangular with the longer edges of said link body forming said edge surfaces, said receiving channel means comprising a first receiving channel leading from a longer edge of the link body to one of the openings therein, and a second receiving channel leading from a shorter edge of said link body to the other opening therein.

2. A wear link f or a tire chain comprising interconnected chain links, said wear link comprising a web-shaped link body adapted to be disposed in a plane perpendicular to the tire chain when stretched out flat and having one edge surface for engaging the tire and a wear edge surface parallel to and facing away from one edge surface for engaging a roadway and openings extending through said link body perpendicular to the plane of the link body for engaging at least one chain link of the tire chain, and link receiving channel means extending from the margin of said link body into at least one of said openings, said opening being spaced apart substantially the distance as chain links of the tire chain which are in opposed relation to each other, said receiving channel means being more narrow than a said opening.

3. A wear link according to claim 2 in which said receiving channel means is substantially parallel to said edge surfaces and is the same width as a said opening.

4. A wear link according to claim 2 in which said link body is substantially rectangular with end edges substantially perpendicular to said edge surfaces, said channel means comprising a first channel extending inwardly from an end edge of the link body to a respective opening, the other opening in the link body being spaced inwardly from the other end edge of the link body a distance about equal to the diameter of said other opening.

5. A wear link according to claim 2 which includes securing links adjacent said openings and carried by the chain links of the tire chain which engage said openings.

6. A wear link according to claim 2 which includes a chain link engaging the openings of said link body and having a central plane which is parallel to the plane of the link body when the tire chain is stretched out flat.

7. A wear link according to claim 2 which includes a chain link engaging the openings of a pair of link bodies which are in face to face engagement and which protrude beyond the chain link at both ends of the link bodies.

8. A wear link according to claim 2 in which the tire chain has a central region and side strands at the side edges of the central region for mounting the chain on a tire, said central regions having a plurality of said link bodies incorporated therein to provide distributed wear surfaces on the tire chain.

9. A wear link according to claim 2 which includes a chain link engaging the openings in said link body, said link body dividing said chain links into a pair of regions, each of which is linked by a further chain link.

10. A wear link according to claim 2 which includes a chain link engaging the openings in said link body, said link body dividing said chain links into a pair of regions, and a web link engaging at least one of said regions, said web link having one edge for engaging a tire and an opposite edge for engaging a roadway.

11. A wear link according to claim 2 which includes a chain link engaging the openings in said link body, said link body dividing said chain link into a pair of regions, and a plurality of further chain links engaging said regions.

12. A wear link according to claim 2 in which the tire chain has a central running section and side sections extending along the side edges of said running section, and hook elements connecting said running and side sections, each hook element having a pair of spaced openings therein with at least one thereof in the form of a hook, each element being web shaped and being disposed edgewise to the plane of the chain when the chain is stretched out flat.

13. A wear link according to claim 2 in which said link body when viewed in a direction perpendicular to said plane is substantially rectangular with the longer edges of said link body forming said edge surfaces, and said receiving channel means comprising a receiving channel extending from each of the shorter edges of said link body to a respective said opening.

14. A wear link for a tire chain comprising interconnected chain links, said wear link comprising a web-shaped link body adapted to be disposed in a plane perpendicular to the tire chain when stretched out flat and having one edge surface for engaging the tire and a wear edge surface parallel to and facing away from one edge surface for engaging a roadway and openings extending through said link body perpendicular to the plane of the link body for engaging at least one chain link of the tire chain, and link receiving channel means extending from the margin of said link body into at least one of said openings, said openings being spaced apart substantially the distance as chain links of the tire chain which are in opposed relation to each other, the link body having end edges extending between said edge surfaces, said channel means comprising a channel extending from one of said edge surfaces into one of said openings, said channel being offset from the center of said one opening toward the other opening.

15. A wear link according to claim 14 in which said channel inclines toward the other opening in the direction outwardly from said one opening.

16. A wear link for a tire chain comprising interconnected chain links, said wear link comprising a web-shaped link body adapted to be disposed in a plane perpendicular to the tire chain when stretched out flat and having one edge surface for engaging the tire and a wear edge surface parallel to and facing away from one edge surface for engaging a roadway and openings extending through said link body perpendicular to the plane of the link body for engaging at least one chain link of the tire chain, and link receiving channel means extending from the margin of said link body into at least one of said openings, said openings being spaced apart substantially the same distance as chain links of the tire chain which are in opposed relation to each other, said link body being substantially rectangular with end edges substantially perpendicular to said edge surfaces, said channel means comprising a first channel extending inwardly from an end edge of the link body to a respective opening, and a second channel extending from a said edge surface of the link body inwardly to the other opening, said second channel and the said other opening being adjacent the other end edge whereby the portion of the link body disposed between said second channel and said other end edge is bendable for opening and closing said second channel.

17. A wear link for a tire chain comprising interconnected chain links, said wear link comprising a web-shaped link body adapted to be disposed in a plane perpendicular to the tire chain when stretched out flat and having one edge surface for engaging the tire and a wear edge surface parallel to and facing away from one edge surface for engaging a roadway and openings extending through said link body perpendicular to the plane of the link body for engaging at least one chain link of the tire chain, and link receiving channel means extending from the margin of said link body into at least one of said openings, said openings being spaced apart substantially the same distance as chain links of the tire chain which are in opposed relation to each other, said channel means comprises a channel extending from a said edge surface inwardly toward a respective opening and to the side of the opening, and a lateral slot leading from the channel to the opening and including a slot restricting nose portion.

* * * * *